(12) United States Patent
Kopikare et al.

(10) Patent No.: US 8,014,744 B1
(45) Date of Patent: *Sep. 6, 2011

(54) ANTENNA DIVERSITY SYSTEM AND METHOD

(75) Inventors: Milind Kopikare, Sunnyvale, CA (US); Brian Bosso, Scotts Valley, CA (US); Partho Mishra, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 71 days.

This patent is subject to a terminal disclaimer.

(21) Appl. No.: 12/480,149

(22) Filed: Jun. 8, 2009

Related U.S. Application Data

(63) Continuation of application No. 11/408,265, filed on Apr. 20, 2006, now Pat. No. 7,546,103.

(60) Provisional application No. 60/724,972, filed on Oct. 7, 2005.

(51) Int. Cl.
*H04B 7/00* (2006.01)

(52) U.S. Cl. ............... 455/277.1; 455/272; 455/121; 455/133; 455/134; 455/226.2; 375/347

(58) Field of Classification Search ......... 455/277.1, 455/272, 121, 133, 134, 226.2, 67.13; 375/347
See application file for complete search history.

(56) References Cited

U.S. PATENT DOCUMENTS

| | | | |
|---|---|---|---|
| 5,530,926 A * | 6/1996 | Rozanski | 455/277.2 |
| 6,377,636 B1 | 4/2002 | Paulraj et al. | |
| 6,452,981 B1 | 9/2002 | Raleigh et al. | |
| 6,563,858 B1 * | 5/2003 | Fakatselis et al. | 375/148 |
| 6,801,580 B2 | 10/2004 | Kadous | |
| 6,850,741 B2 | 2/2005 | Lei et al. | |
| 2002/0181390 A1 | 12/2002 | Mody et al. | |
| 2003/0035491 A1 | 2/2003 | Walton et al. | |
| 2003/0043732 A1 | 3/2003 | Walton et al. | |
| 2003/0043929 A1 | 3/2003 | Sampath | |
| 2003/0223391 A1 | 12/2003 | Malaender et al. | |
| 2004/0082303 A1 | 4/2004 | Giannakis et al. | |
| 2005/0186921 A1 | 8/2005 | Hoo et al. | |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner* — Sanh D Phu (57) ABSTRACT

A wireless network device includes a plurality of antennas for transmitting and receiving data packets. An antenna diversity module measures at least one of an average signal-to-noise ratio and a packet error rate associated with the data packets and selects a given antenna of the plurality of antennas based on at least one of the average signal-to-noise ratio and the packet error rate. The antenna diversity module measures a first average signal-to-noise ratio or a first packet error rate while utilizing a first antenna of the plurality of antennas, measures a second average signal-to-noise ratio or a second packet error rate while utilizing a second antenna of the plurality of antennas, and selects the given antenna based at least in part on a comparison of the first average signal-to-noise ratio to the second average signal-to-noise ratio or a comparison of the first packet error rate to the second packet error rate.

8 Claims, 8 Drawing Sheets

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

802.11n; IEEE P802.11-04/0889r6; Wireless LANs, TGn Sync Proposal Technical Specification; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V 14, Jul. 16, 2004, Draft 802.20 Permanent Document, System Requirements for IEEE 802.20 Mobile Broadband Wireless Access Systems—Version 14, 23 pages.

* cited by examiner

ANTENNA DIVERSITY SYSTEM AND METHOD

CROSS-REFERENCE TO RELATED APPLICATIONS

This application is a continuation of U.S. patent application Ser. No. 11/408,265, filed Apr. 20, 2006, which claims the benefit of U.S. Provisional Application No. 60/724,972, filed Oct. 7, 2005. The disclosures of the above applications are incorporated herein by reference in their entirety.

FIELD

The present invention relates to antenna diversity systems, and more particularly to an antenna utilization control method for use in diversity antenna systems.

BACKGROUND

Wireless network devices with antenna diversity are employed to reduce signal fading in wireless communication applications. These wireless network device include two or more antennas. One of the antennas is employed to transmit and receive packets at a time. Signal to noise ratio (SNR) of each antenna is measured during a preamble of a packet and the antenna is selected.

Figure 1:
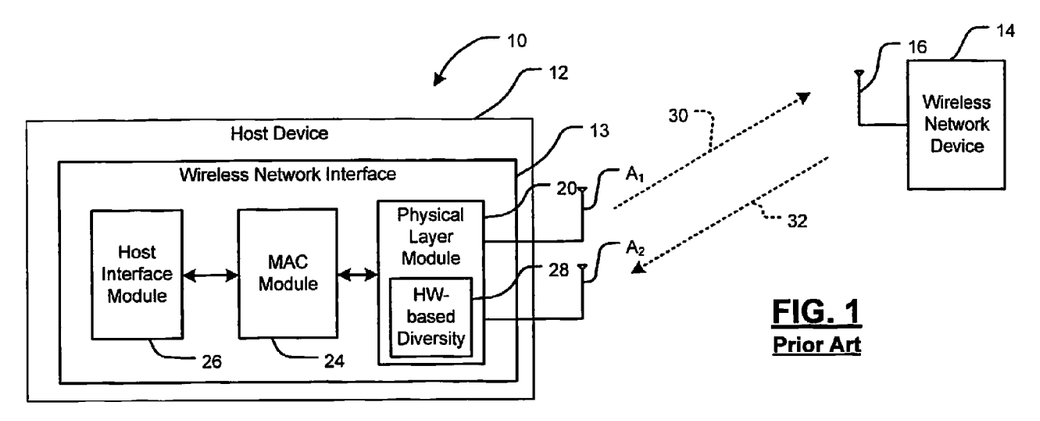
FIG. 1 is a functional block diagram of a wireless network device including a hardware based antenna diversity module according to the prior art.

Referring now to FIG. 1, a wireless network device 10 including hardware-based antenna diversity is shown. The wireless network device 10 typically includes a host device 12 such as a laptop, personal digital assistant, desktop computer or other computing device. The host device 12 includes a wireless network interface 13. The wireless network interface 13 communicates with another wireless network device 14 having an antenna system 16. The wireless network interface 13 may include a physical layer (PHY) module 20 that provides an interface between a medium access control (MAC) module 24 and a wireless medium. A host interface module 26 may provide an interface between the MAC module 24 and the host device 12. A hardware-based antenna diversity module 28 selects between a first antenna A1 and a second antenna A2 based on measurements made when packets are received.

Figure 2:
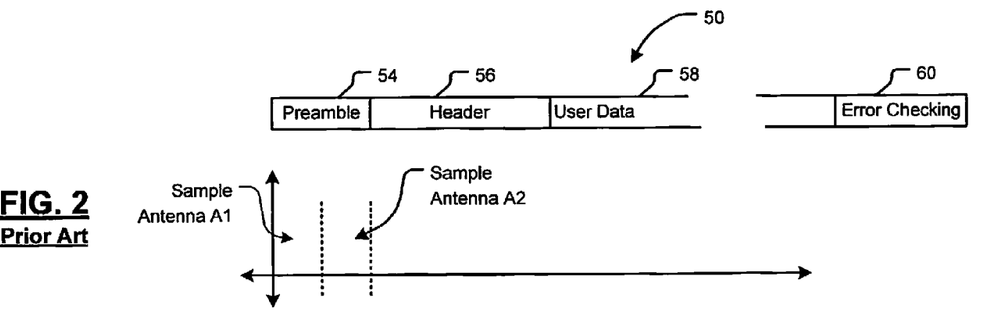
FIG. 2 illustrates sampling of SNR of the preamble to determine antenna selection according to the prior art.

Referring now to FIG. 2, the wireless network device 14 exchanges packets 50 with the wireless network interface 13. The packets 50 may include a preamble portion 54, a header portion 56, a variable length user data portion 58 and an error checking portion 60. The hardware-based antenna diversity module 28 samples a SNR of the preamble portion 54 and selects one of the antennas A1 or A2. More particularly, the hardware-based antenna diversity module 28 samples SNR of the first antenna during a first half of the preamble portion 54 of the packet 50. During a second half of the preamble portion 54, the hardware-based antenna diversity module 28 samples SNR of the second antenna. Based on the SNR sampling, the hardware-based antenna diversity module selects one of the antennas to be used for the packet.

SUMMARY

A wireless network device includes a plurality of antennas for transmitting and receiving data packets. An antenna diversity module measures at least one of an average signal-to-noise ratio and a packet error rate associated with the data packets and selects a given antenna of the plurality of antennas based on at least one of the average signal-to-noise ratio and the packet error rate. The antenna diversity module measures a first average signal-to-noise ratio or a first packet error rate while utilizing a first antenna of the plurality of antennas, measures a second average signal-to-noise ratio or a second packet error rate while utilizing a second antenna of the plurality of antennas, and selects the given antenna based at least in part on a comparison of the first average signal-to-noise ratio to the second average signal-to-noise ratio or a comparison of the first packet error rate to the second packet error rate.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The approach used by the hardware-based antenna diversity module 28 in FIG. 1 has several drawbacks. The approach is based upon sampling during the receipt of packets. In other words, there is no information as to whether the selected antenna is the best antenna for transmitting packets. In addition, sampling during one half of the preamble portion may be an interval this is too short to make an informed decision when particular signals such as orthogonal frequency division multiplexing (OFDM) signals are received.

Figure 3A:
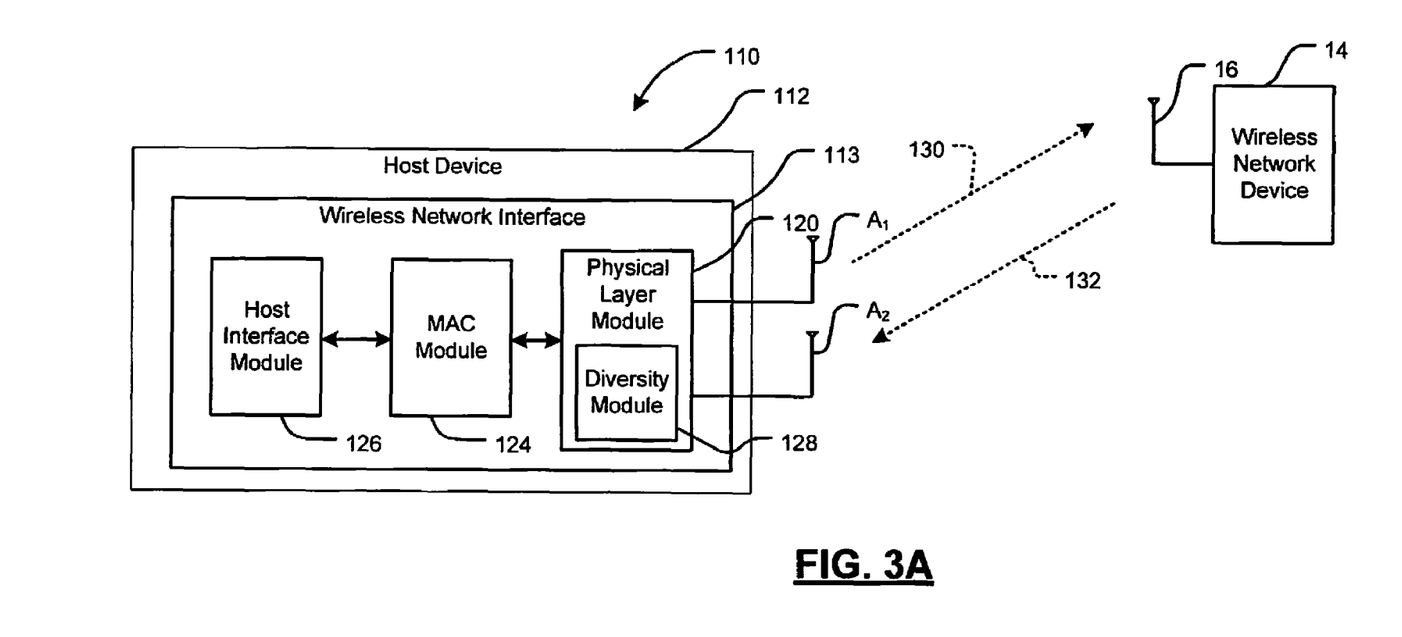
FIG. 3A is a functional block diagram of an exemplary wireless network device including an antenna diversity module according to the present disclosure.
Figure 3B:
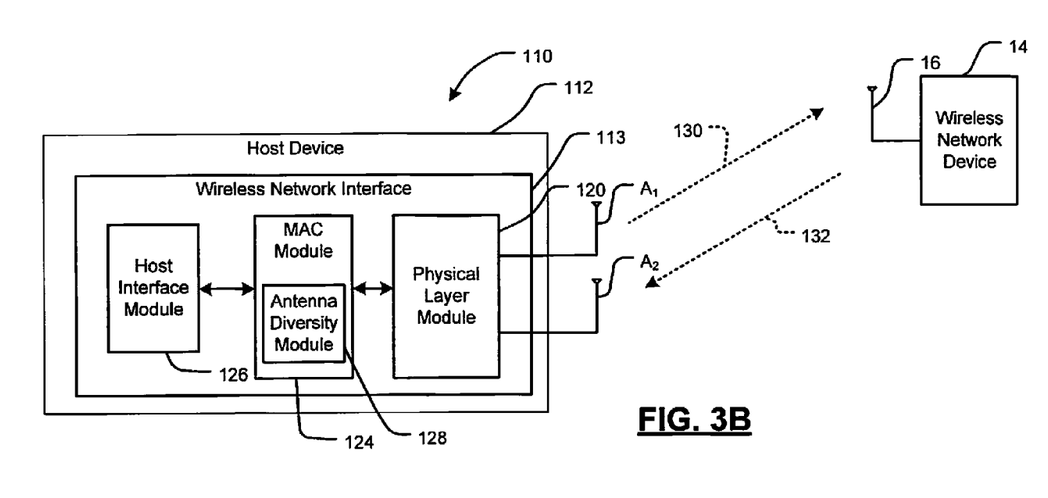
FIG. 3B is a functional block diagram of an exemplary wireless network device including an antenna diversity module according to the present disclosure.

Referring now to FIGS. 3A and 3B, wireless network devices including an antenna diversity module according to the present disclosure are shown. In FIG. 3A, a wireless network device 110 typically includes a host device 112 such as a laptop, personal digital assistant, desktop or other computing device. The host device 112 includes a wireless network interface 113. The wireless network interface 113 communicates with another wireless network device 14 having an antenna system 16.

The wireless network device 113 includes a physical layer (PHY) module 120 that provides an interface between a medium access control (MAC) module 124 and a wireless medium. A host interface module 126 provides an interface between the MAC module 124 and the host device 112. An antenna diversity module 128 may be associated with the physical layer device 120 and may select between two or more antennas. In FIG. 3A, the antenna diversity module 128 selects between a first antenna A1 and a second antenna A2. In FIG. 3B, the antenna diversity module 128 may be associated with the MAC module 120 and may select between a first antenna A1 and a second antenna A2. The antenna diversity module 128 may be associated with other components of the wireless network interface 113.

Figure 3C:
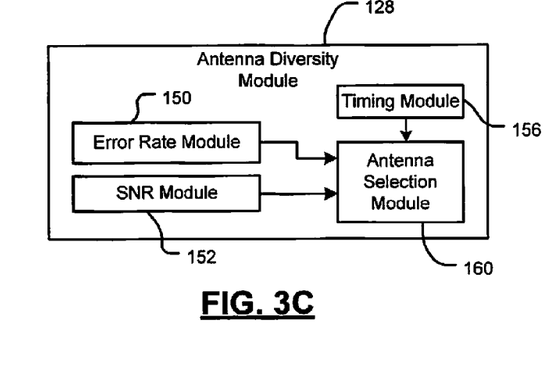
FIG. 3C is a more detailed functional block diagram of an exemplary antenna diversity module.

Referring now to FIG. 3C, the antenna diversity module 128 is shown. The antenna diversity module 128 includes an error rate module 150 that determines an error rate during transmission of packets from the wireless network interface 113 to the wireless network device 14. The error rate may be a packet error rate (PER), a bit error rate (BER), a symbol error rate (SER), and/or any other suitable error rate. A signal-to-noise ratio (SNR) module 152 determines a SNR of signals received by the wireless network interface 113. A timing module 156 generates timing signals to identify one or more predetermined periods. An antenna selection module 160 receives the error rate estimate, the SNR estimate and the predetermined periods and selects an antenna to be used. The antenna diversity module 122 bases the antenna selection decision on the error rate estimate and/or the SNR of multiple packets as will be described further below.

Figure 4A:
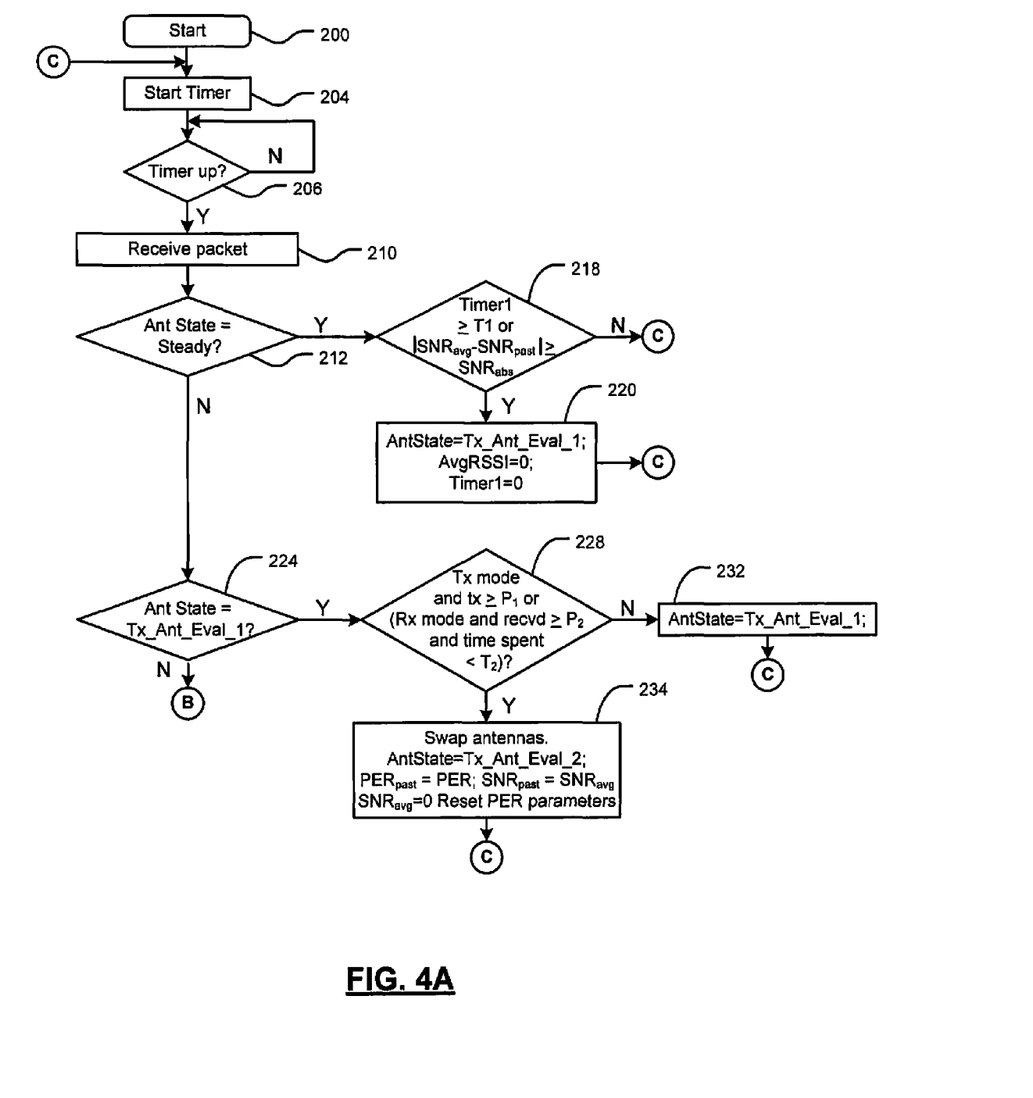
FIGS. 4A and 4B are flowcharts illustrating operation of the diversity modules of FIGS. 3A and 3B.
Figure 4B:
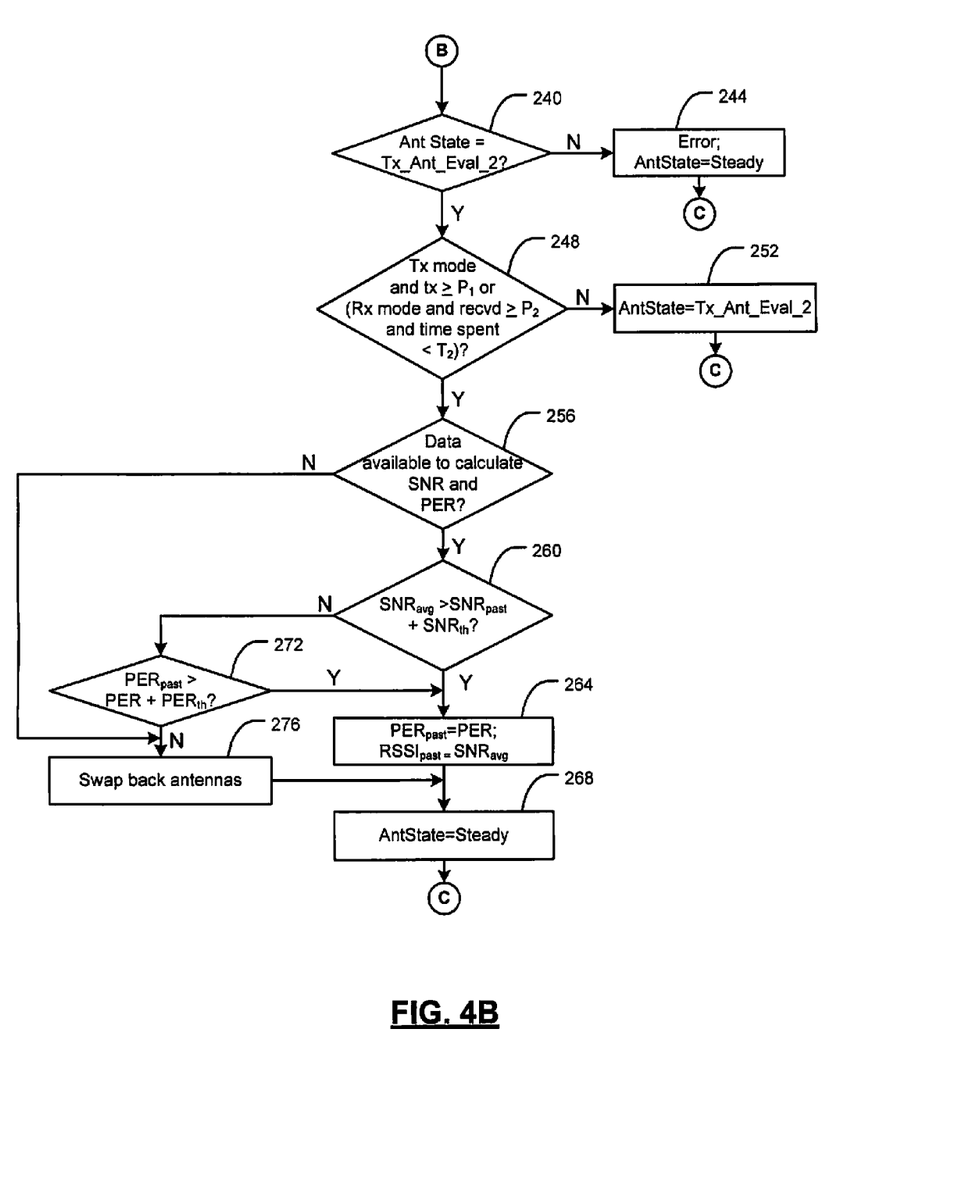

Referring now to FIGS. 4A and 4B, operation of the antenna diversity module of FIGS. 3A and 3B is illustrated. Control begins with step 200 and proceeds to step 204 where a timer is started. When the timer is up as determined in step 206, a packet is received in step 210. In step 212, control determines whether the antenna state is equal to steady. If true, control continues with step 218 determines whether a first timer (Timer1) is greater than a first period T1 or $|SNR_{avg} - SNR_{past}| \geq SNR_{abs}$. $SNR_{avg}$ is an average SNR. $SNR_{past}$ is a prior stored value. $SNR_{abs}$ is an SNR difference threshold. If step 218 is false, control returns to step 204. If step 218 is true, control continues with step 220 and sets AntState=Tx_Ant_Eval_1, $RSSI_{Avg}$=0 and Timer1=0. RSSI is a received signal strength indicator. After step 220, control returns to step 204.

When step 212 is false, control continues with step 224 and determines whether the antenna state is equal to Tx_Ant_Eval_1. If step 224 is true, control continues with step 228 and determines whether (Tx mode is true and tx>P1 (a predetermined number of packets have been sent)) or (Rx mode is true and recvd>P2 (received number of packets) and time spent<T2). If step 228 is false, control sets the antenna state is equal to Tx_Ant_Eval_1 and control returns to step 204.

When step 228 is true, control swaps antennas, sets AntState=Tx_Ant_Eval_2, $PER_{past}$=PER, $SNR_{past}$=$SNR_{avg}$, $SNR_{avg}$=0 and resets PER parameters. After step 228, control returns to step 212. When step 224 is false, control continues with step 240 and determines whether the antenna state is equal to Tx_Ant_Eval_2. If false, an error occurs, the antenna state is set equal to steady and control returns to step 204.

When step 240 is true, control continues with step 248 and determines whether (Tx mode and tx>$P_1$) or (Rx mode and recvd>$P_2$ and time spent<$T_2$) If step 248 is false, control continues with step 252 and sets the antenna state equal to Tx_Ant_Eval_2. Control continues from step 252 with step 204.

When step 248 is true, control determines whether data is available to calculate the SNR and PER. If step 256 is true, control continues with step 260 and determines whether $SNR_{avg}$>$SNR_{past}$+$SNR_{th}$. If step 260 is true, control continues with step 264 and sets $PER_{past}$=PER and $RSSI_{past}$=$SNR_{avg}$. Control continues from step 264 with step 268 where the antenna state is set equal to steady and control returns to step 204.

When step 256 is false, control continues with step 276 and swaps back antennas. When step 260 is false, control determines whether $PER_{past}$>PER+$PER_{th}$ in step 272. If true, control continues with step 264 described above. If step 272 is false, control swaps back antennas in step 276. Control continues from steps 264 and 276 with step 268.

As an example, the timer may have a period of 5 seconds. The value of P1 can be set equal to 100 packets. The value of P2 may be set equal to 15 packets. The value of T2 may be set equal to 200 milliseconds. The $SNR_{th}$ may be set equal to 4 dB. The $SNR_{abs}$ may be set equal to 4 dB.

The wireless network device can be compliant with IEEE standards 802.11, 802.11a, 802.11b, 802.11g, 802.11h, 802.11n, 802.16, 802.20, Bluetooth, and/or other suitable standards.

Figure 5A:
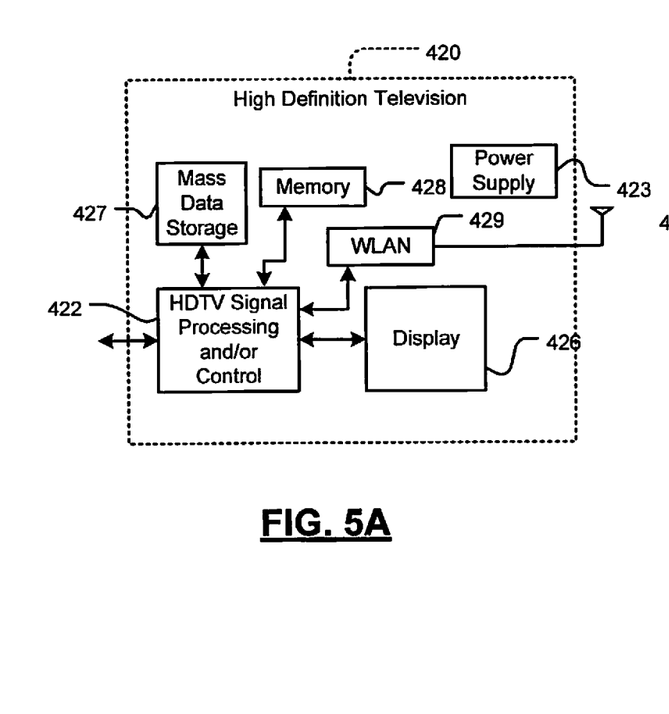
FIG. 5A is a functional block diagram of a high definition television.

Referring now to FIG. 5A, the device can be implemented in a wireless network interface of a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 5B:
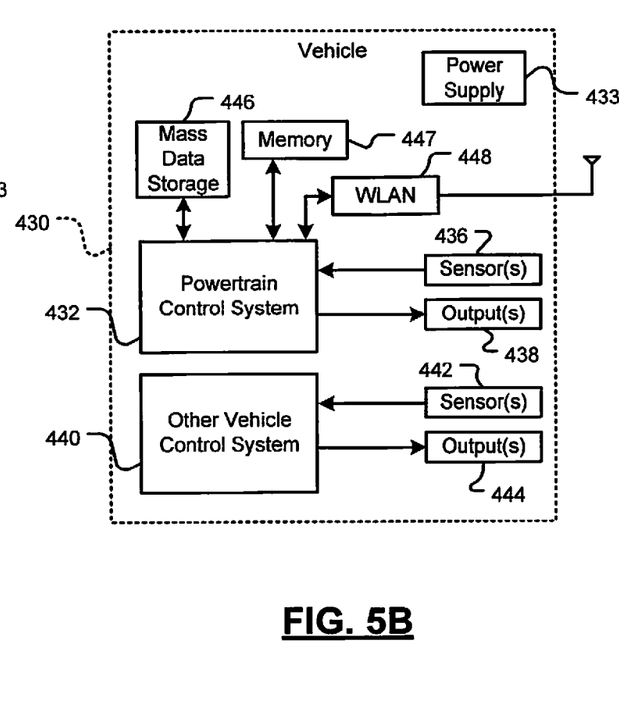
FIG. 5B is a functional block diagram of a vehicle control system.

Referring now to FIG. 5B, the device may implement and/or be implemented in a WLAN interface of a vehicle. In some implementations, the device implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The device may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 5C:
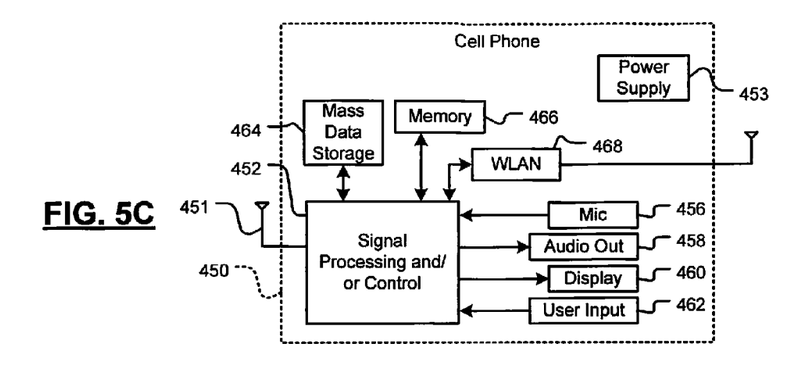
FIG. 5C is a functional block diagram of a cellular phone.

Referring now to FIG. 5C, the device can be implemented in a WLAN interface of cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 5D:
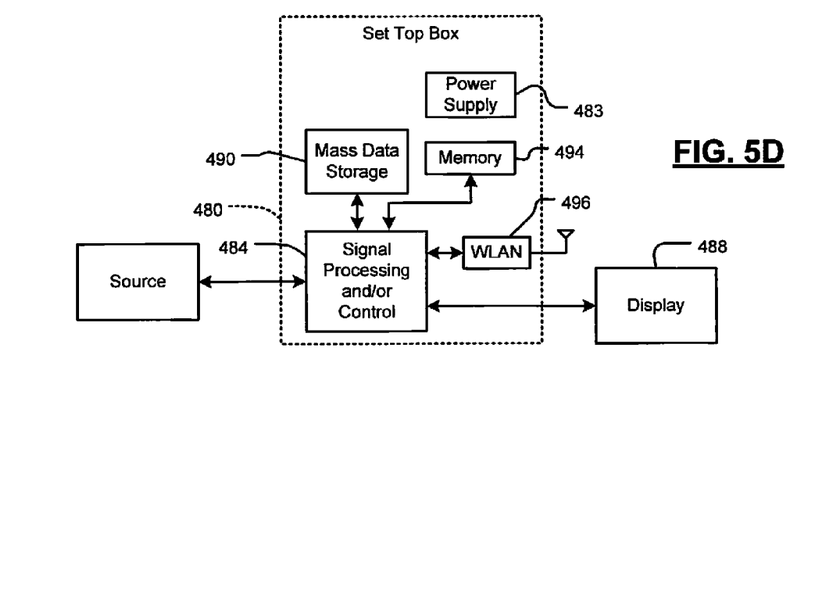
FIG. 5D is a functional block diagram of a set top box.

Referring now to FIG. 5D, the device can be implemented in a WLAN interface of a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 5E:
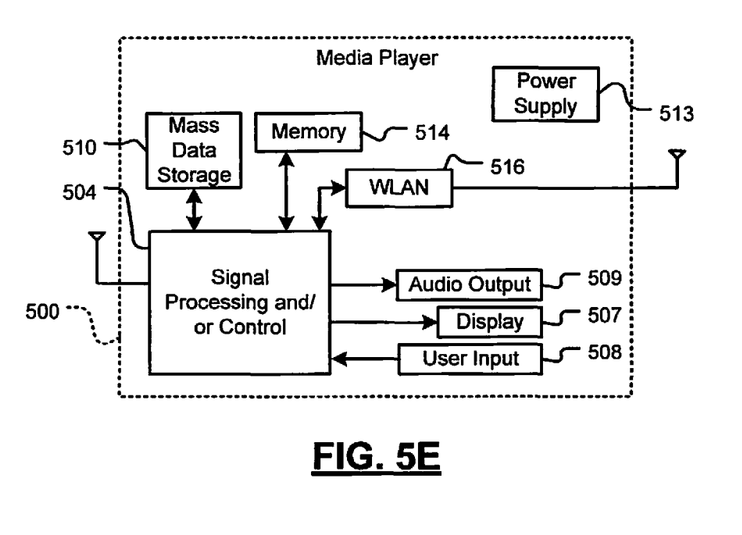
FIG. 5E is a functional block diagram of a media player.

Referring now to FIG. 5E, the device can be implemented in a WLAN interface of a media player 500. The device may implement and/or be implemented in a WLAN interface. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A wireless network device, comprising:
a plurality of antennas for transmitting and receiving data packets; and
an antenna diversity module to
measure at least one of an average signal-to-noise ratio and a packet error rate associated with the data packets; and
select a given antenna of the plurality of antennas based on at least one of the average signal-to-noise ratio and the packet error rate,
wherein the antenna diversity module
measures a first average signal-to-noise ratio or a first packet error rate while utilizing a first antenna of the plurality of antennas,
measures a second average signal-to-noise ratio or a second packet error rate while utilizing a second antenna of the plurality of antennas, and
selects the given antenna based at least in part on a comparison of the first average signal-to-noise ratio to the second average signal-to-noise ratio or a comparison of the first packet error rate to the second packet error rate, and
wherein the antenna diversity module comprises
a signal-to-noise ratio module to estimate the average signal-to-noise ratio associated with the data packets, and
an error rate module to estimate the packet error rate associated with the data packets.

2. The wireless network device of claim 1, further comprising a physical layer module to provide an interface with a wireless medium, wherein the physical layer module comprises the antenna diversity module.

3. The wireless network device of claim 1, further comprising a medium access control module to provide an interface with a host device, wherein the medium access control module comprises the antenna diversity module.

4. The wireless network device of claim 1, wherein the antenna diversity module initiates an evaluation mode when the average signal-to-noise ratio differs from a stored signal-to-noise ratio by a predetermined amount.

5. A method for operating a wireless network device, the method comprising:
  transmitting and receiving data packets using a plurality of antennas;
  measuring at least one of an average signal-to-noise ratio and a packet error rate associated with the data packets, including
    estimating the average signal-to-noise ratio associated with the data packets;
    estimating the packet error rate associated with the data packets:
    measuring a first average signal-to-noise ratio or a first packet error rate while utilizing a first antenna of the plurality of antennas; and
    measuring a second average signal-to-noise ratio or a second packet error rate while utilizing a second antenna of the plurality of antennas; and
  selecting a given antenna of the plurality of antennas based on the at least one of the average signal-to-noise ratio and the packet error rate, wherein selecting the given antenna includes
    comparing the first average signal-to-noise ratio to the second average signal-to-noise ratio, or comparing the first packet error rate to the second packet error rate.

6. The method of claim 5, further comprising initiating an evaluation mode when the average signal-to-noise ratio differs from a stored signal-to-noise ratio by a predetermined amount.

7. A computer-readable medium that stores a computer program for operating a wireless network device, the computer program comprising instructions executable by a processor for:
  transmitting and receiving data packets using a plurality of antennas;
  measuring at least one of an average signal-to-noise ratio and a packet error rate associated with the data packets, including
    estimating the average signal-to-noise ratio associated with the data packets;
    estimating the packet error rate associated with the data packets;
    measuring a first average signal-to-noise ratio or a first packet error rate while utilizing a first antenna of the plurality of antennas; and
    measuring a second average signal-to-noise ratio or a second packet error rate while utilizing a second antenna of the plurality of antennas; and
  selecting a given antenna of the plurality of antennas based on the at least one of the average signal-to-noise ratio and the packet error rate, wherein selecting the given antenna includes
    comparing the first average signal-to-noise ratio to the second average signal-to-noise ratio, or comparing the first packet error rate to the second packet error rate.

8. The computer-readable medium of claim 7, further comprising instructions for initiating an evaluation mode when the average signal-to-noise ratio differs from a stored signal-to-noise ratio by a predetermined signal-to-noise ratio threshold.

* * * * *